United States Patent [19]

Cadwell

[11] Patent Number: 4,584,885

[45] Date of Patent: Apr. 29, 1986

[54] CAPACITIVE DETECTOR FOR TRANSDUCERS

[75] Inventor: Robert M. Cadwell, Sunnyvale, Calif.

[73] Assignees: Harry E. Aine; Barry Block, both of Los Altos, Calif.

[21] Appl. No.: 572,582

[22] Filed: Jan. 20, 1984

[51] Int. Cl.[4] ............................ G01L 1/08; G01L 1/14
[52] U.S. Cl. ................................ 73/862.61; 73/517 B; 73/862.64; 324/61 R; 340/870.37
[58] Field of Search ............... 73/517 R, 517 B, 701, 73/718, 724, 862.61, 862.64, 780; 177/210 C, 212; 318/662; 340/870.37; 324/61 R

[56] References Cited

U.S. PATENT DOCUMENTS

| | | | |
|---|---|---|---|
| 3,209,601 | 10/1965 | Stiles | 73/517 B |
| 3,229,530 | 1/1966 | Wilcox et al. | 73/517 B |
| 3,845,377 | 10/1974 | Shimotori | 318/662 |
| 3,877,313 | 4/1975 | Ferriss | 73/517 B X |
| 4,122,708 | 10/1978 | Maier | 324/61 R X |
| 4,336,718 | 6/1982 | Washburn | 73/862.61 X |

Primary Examiner—Charles A. Ruehl
Attorney, Agent, or Firm—Harry E. Aine

[57] ABSTRACT

Displacement of a movable transducer element is measured by exciting a capacitive gap (preferably differential capacitive gaps) with triangular waves of voltage to obtain a square current wave output into a zero input impedance amplifier. The square wave output is amplified and synchronously detected to produce a d.c. output signal proportional to displacement. The d.c. output signal is fed back to force rebalance electrodes to electrostatically rebalance the movable transducer element. The feedback signal is a measure of the force being transduced. Initial offsets in the position of the transducer element and capacitances of the capacitive gaps are compensated by signals derived from the capacitive gap excitation waveforms.

33 Claims, 11 Drawing Figures

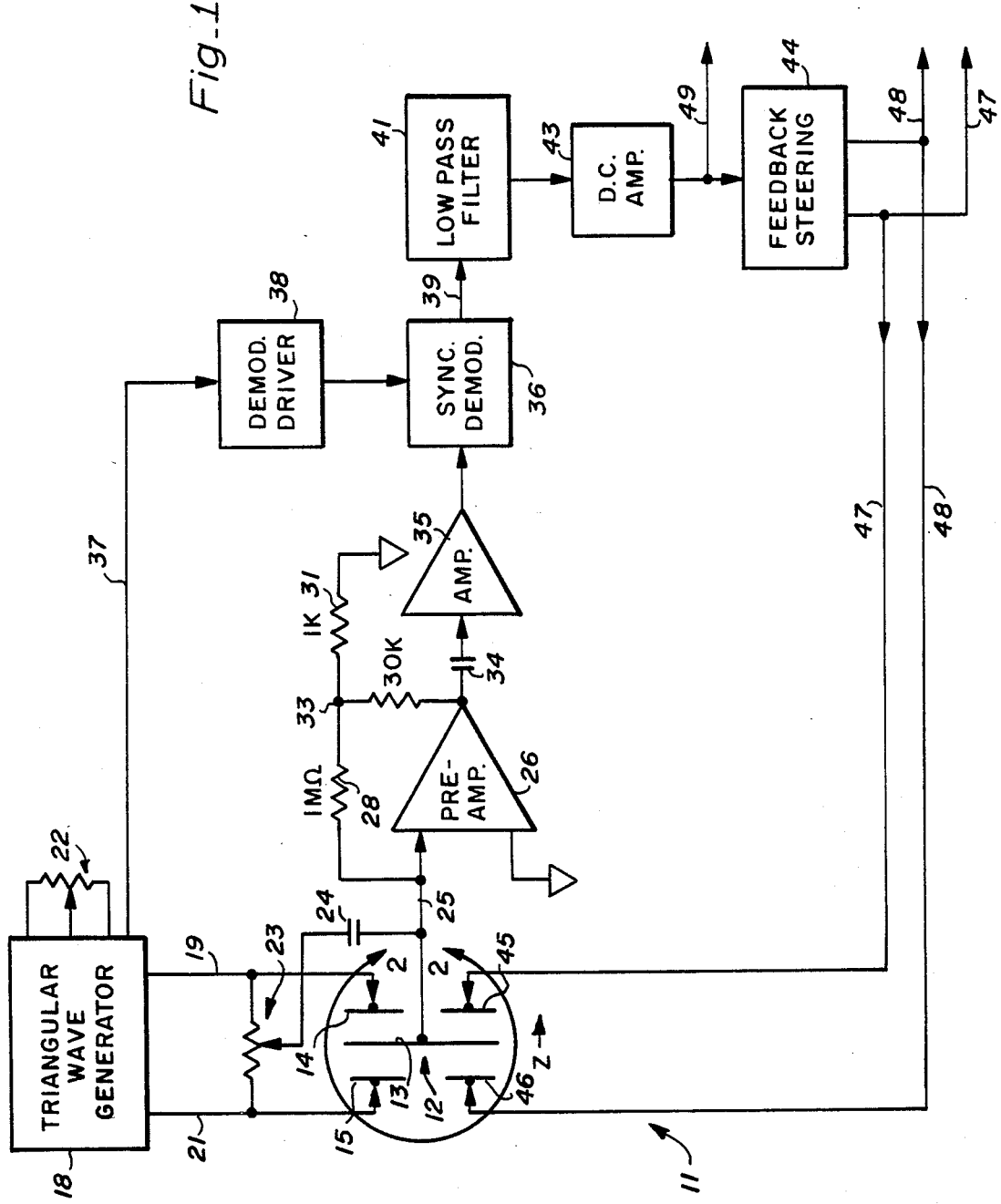

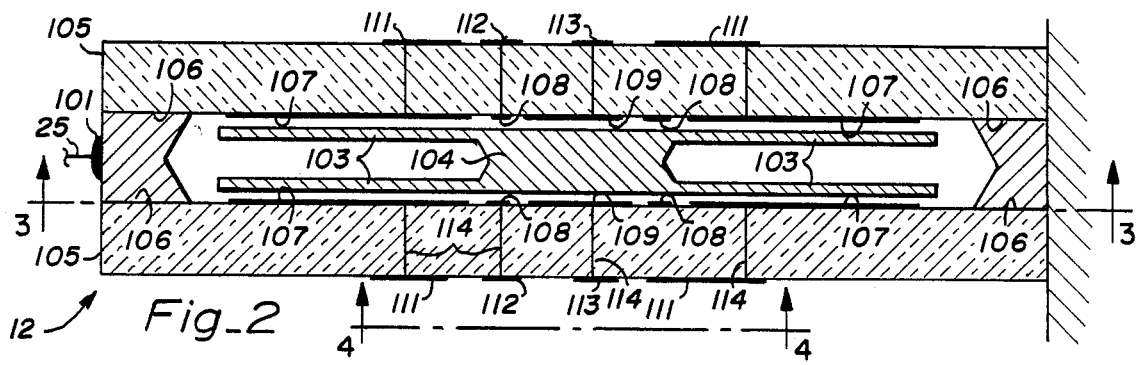
Fig_2
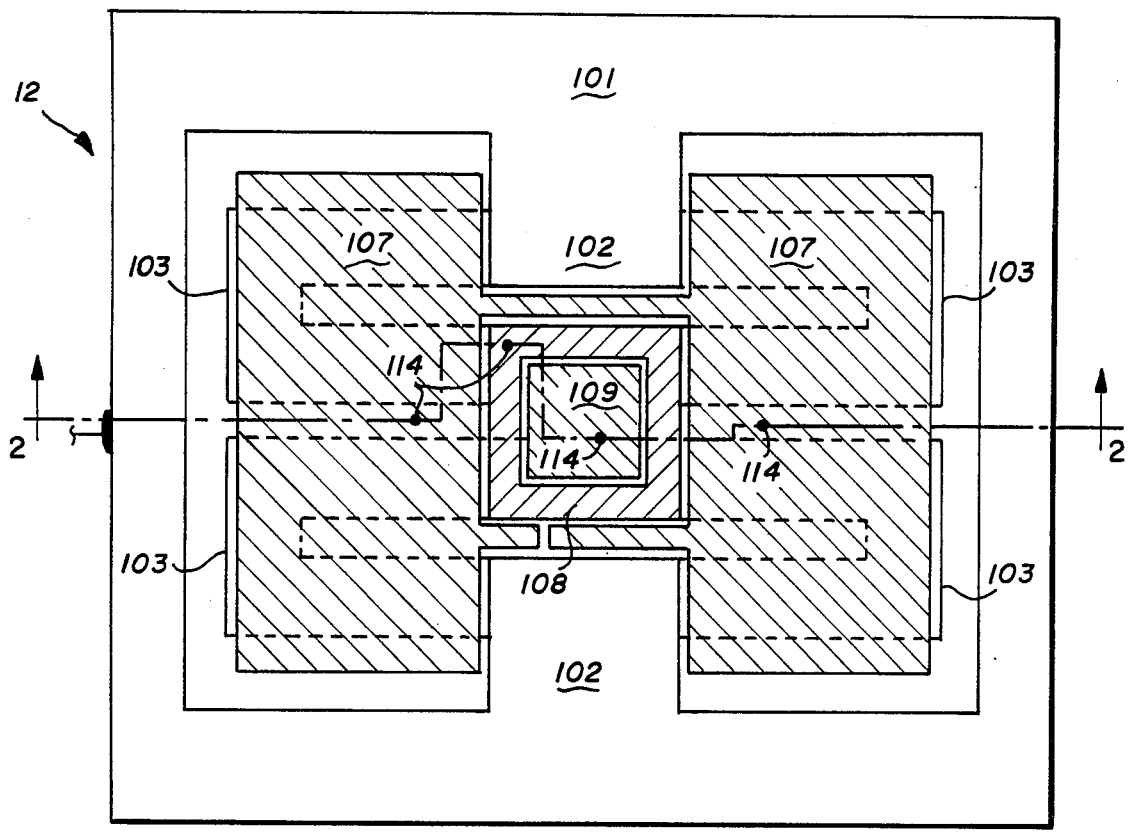
Fig_3
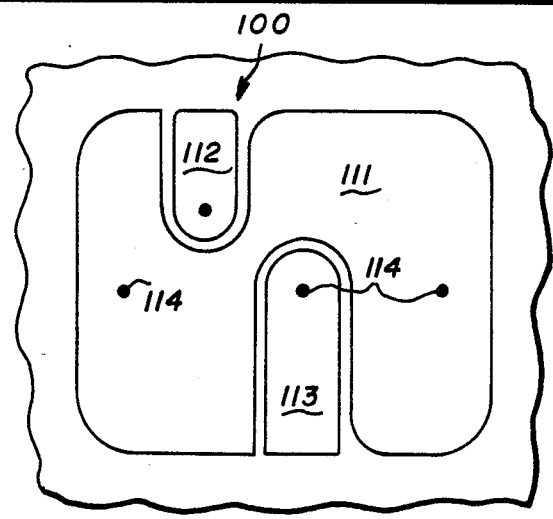
Fig_4

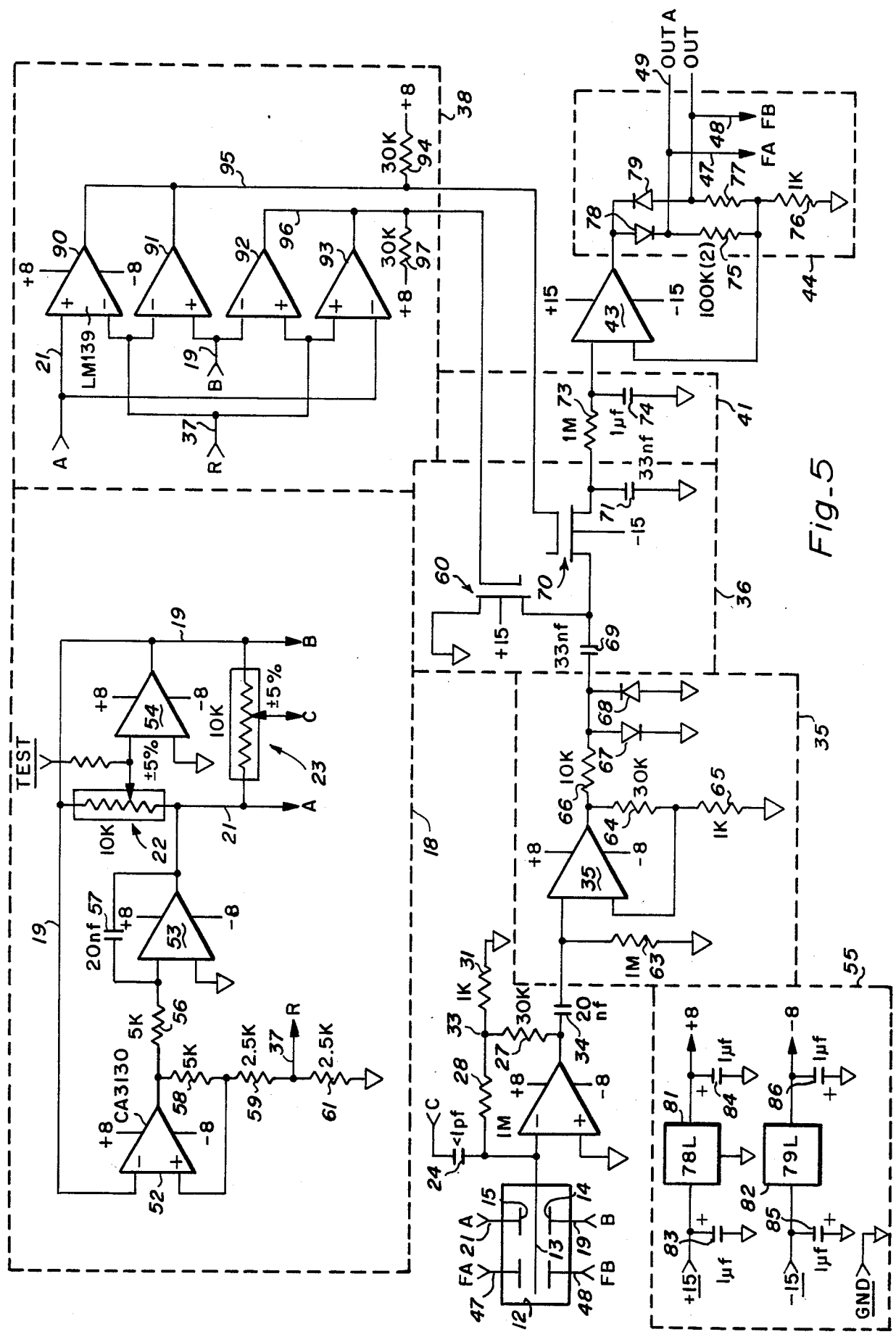
Fig_5

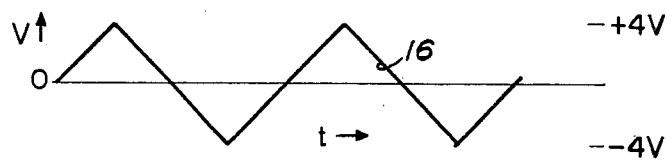
Fig_6
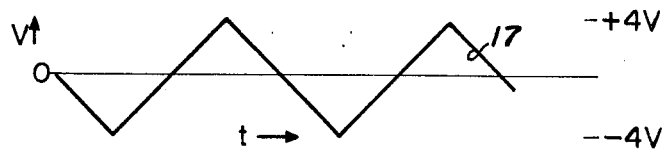
Fig_7
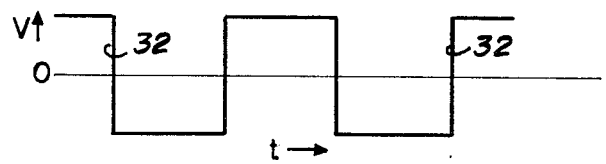
Fig_8
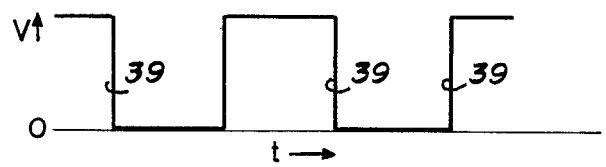
Fig_9
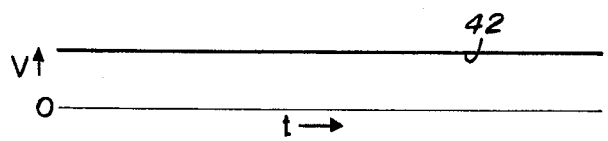
Fig_10
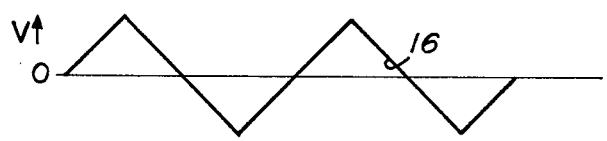
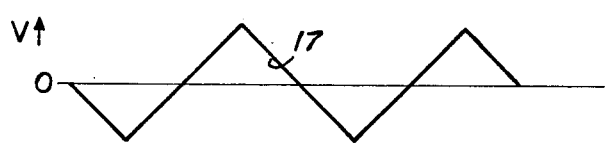
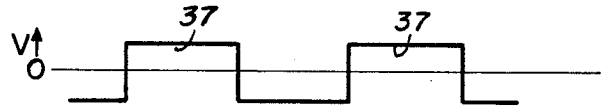
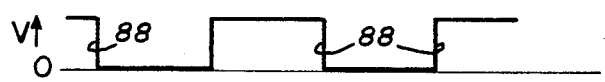
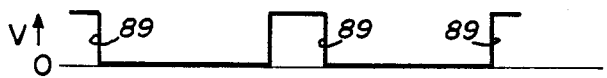
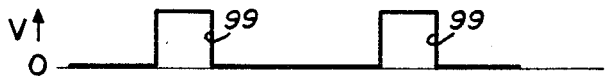
Fig_11

4,584,885

CAPACITIVE DETECTOR FOR TRANSDUCERS

BACKGROUND OF THE INVENTION

The present invention relates in general to method and apparatus for capacitively sensing and/or controlling displacement in a solid state semiconductive transducer and to improved devices using same such as microphones, pressure sensors and accelerometers.

DESCRIPTION OF THE PRIOR ART

Heretofore, solid state semiconductive transducers such as accelerometers, pressure sensors, and the like have employed capacitive detection for detecting displacement of a moveable member relative to a reference member. Examples of such devices are found in U.S. Pat. No. 4,091,680 issued May 30, 1978; U.S. Pat. No. 4,144,516 issued Mar. 13, 1979; U.S. Pat. No. 4,197,752 issued Apr. 15, 1980, and U.S. Government contract report entitled Monolithic Accelerometer, No. AFW-AL-TR-81-1242, dated December 1981, pages 11–16.

The problem with these prior art capacitive detector systems is that they are sensitive to stray input capacitance to ground. In miniature devices, the stray capacitance can be larger than the capacitance of the device being detected. Changes in the stray capacitance produce false output signals and it is desired to obtain a capacitive detector, particularly useful for detecting movement of miniature semiconductive transducers which will be immune to input stray capacitance to ground.

It is also known from the prior art to employ a differential capacitive sensor with electrostatic feedback for sensing movement of a diaphragm in a differential pressure measuring device. Such a system is disclosed in an article appearing in Microtecnic Volume XXI, No. 3, pages 291–293 and Volume XXI, No. 4, at pages 388–390 and 413, circa 1967.

Use of feedback and using the fedback signal as the output of the capacitive detection system substantially improves the dynamic range and performance of the system.

SUMMARY OF THE PRESENT INVENTION

The principal object of the present invention is the provision of an improved method and apparatus for capacitively sensing displacement in a solid state semiconductive transducer.

In one feature of the present invention, a variable capacitive gap between a first and second member is electrically excited with a time-varying voltage and a signal is sensed having an amplitude variable in accordance with the spacing of the capacitive gap and that signal is amplified in an amplifier having essentially zero input impedance-to-ground, whereby the amplitude of the output signal is generally independent of stray input capacitance-to-ground of the amplifier.

In another feature of the present invention, the capacitive gap is excited with a periodic voltage characterized in that in a first portion of the period the voltage changes with time at a generally constant first rate and has a first sign and during a second substantial portion of the period the voltage changes with time at a generally constant rate but of opposite sign, whereby the output current signal derived from the gap is characterized in that in a first substantial portion of the period, the current is of non-zero amplitude and generally constant with time and of one sign and during a second substantial portion of the period the output signal current is of non-zero amplitude, generally constant with time and of a second sign, whereby measurement of the current signal is facilitated.

In another feature of the present invention, the output signal is demodulated at a period equal to or harmonically related to the period of the time-varying excitation applied to the capacitive gap to derive a d.c. output signal of an amplitude which is a function of the variable gap spacing between the first and second member.

In another feature of the present invention, a sensor includes a moveable plate of a differential capacitor having a pair of gaps which are excited with periodic voltage of opposite sign, whereby certain undesired temperature coefficients associated with the sensor are cancelled.

In another feature of the present invention, the time-varying excitation applied for exciting the capacitive gaps is a pair of triangular waves.

In another feature of the present invention, an output signal is derived which is fed back to additional capacitive gaps associated with the moveable member so as to electrostatically force the moveable member back to a null position.

In another feature of the present invention, the amplitude of the excitation voltage for exciting the capacitive gaps is adjusted to compensate for initial offsets of the differential capacitor due to unequal mutually opposed areas of the pair of excited capacitive gaps.

In another feature of the present invention, initial offset in the gap spacings of the differential capacitor are compensated by deriving a compensating time-varying signal from the gap excitation voltages used to excite the capacitive gaps and adding the compensating signal to the sensed output signal.

Other features and advantages of the present invention will become apparent upon a perusal of the following specification taken in connection with the accompanying drawings wherein:

BRIEF DESCRIPTION OF THE DRAWINGS

FIG. 1 is a schematic circuit digram, partly in block diagram form, of a transducer incorporating capacitive sensing features of the present invention, FIG. 2 is a cross-sectional view of a semiconductive accelerometer transducer portion of the structure of FIG. 1 delineated by line 2—2, FIG. 3 is a sectional view of the structure of FIG. 2 taken along line 3—3 in the direction of the arrows, FIG. 4 is a view of the structure of FIG. 2 taken along line 4—4 in the direction of the arrows, FIG. 5 is a schematic circuit diagram of the circuit of FIG. 1 showing the circuit in greater detail, FIGS. 6–10 are waveform diagrams depicting various signals obtained in the circuit of FIG. 5, and FIG. 11 is a composite drawing showing the waveforms associated with the demodulation drive portion of the circuit of FIG. 5.

DESCRIPTION OF THE PREFERRED EMBODIMENTS

Referring now to FIG. 1, there is shown a system of the present invention for capacitively sensing displacement of a force transducer 12. The transducer 12 is more fully disclosed in FIGS. 2–4 but briefly comprises an accelerometer having a sensing mass 13 moveable along an axis of sensitivity, i.e., "Z" direction, in response to a force of acceleration exerted on the sensing mass structure 13. A pair of capacitive drive plate electrodes 14 and 15 are disposed on opposite sides of the sensing mass 13 to define a differential capacitor structure, i.e., a pair of capacitive gaps connected in series with the excitation voltages with the sensing mass moving toward one drive plate and away from the other in response to a force of acceleration so as to unbalance the capacitances of the capacitive gaps.

The capacitive gaps are excited with triangular wave shape voltages of opposite sign, as indicated by waveforms 16 and 17 of FIGS. 6 and 7, respectively. The triangular waveforms are derived from a triangular wave generator 18 via lines 19 and 21. A potientiometer 22, operatively associated with the triangular wave generator 18, permits adjustment of the relative amplitudes of the triangular waves 16 and 17. A second potientiometer 23 is connected across the two output lines 19 and 21 and a triangular wave signal is derived from the potientiometer which has a fraction of the amplitude of either one of the two waves, depending upon its position, such sampled signal being applied to the sensing mass electrode 13 via the intermediary of a coupling capacitor 24.

The triangular excitation voltage waves 16 and 17 applied to the outer drive plates 14 and 15 of the differential capacitive transducer produce in lead 25 a time-varying current flowing to and from ground via the intermediary of series connected resistors 28 and 31. The current which flows, due to the constant rate of change of the applied voltage, is a square wave 32 as shown in FIG. 8. The phase of the square wave 32, with respect to the applied excitation voltage, depends upon whether the moveable sensing plate 13 is closer to one or the other of the drive plates 14 and 15 and the amplitude of the square wave 32 is a function of the displacement of the sensing plate 13 relative to the mid point or null position.

Lead 25 is connected to the input of a preamplifier 26 having negative feedback so that the current flowing from the output of the preamplifier-to-ground via resistors 27 and 31 produces a potential at node 33 which is equal to the voltage developed across resistor 28 by the current in lead 25 to maintain input lead 25 at ground potential. The output of the preamplifier 26 is a square wave of voltage which is fed via a coupling capacitor 34 to the input of a second amplifier 35 wherein it is amplified and thence fed to one input of a synchronous demodulator 36. The gain of the preamplifier 26 is determined by the ratio of resistor 27 to resistor 31. In a typical example, the gain is 30.

A reference output is derived from the triangular wave generator via lead 37 and fed to the input of a demodulator driver 38 which produces an output for driving the synchronous demodulator 36 so as to sample the two amplitude levels of the square voltage wave fed to the input of the synchronous demodulator 36 from amplifier 35. The output of the synchronous demodulator 36 is a square wave 39 (FIG. 9) of voltage having been referenced to ground potential and with the polarity of the square wave 39 being determined by the sense of the offset of the moveable sensing plate 13 of the differential capacitor 12 relative to the null position.

The output of synchronous demodulator 39 is fed to the input of a low pass filter 41 which converts the square wave to a d.c. value as shown at 42 in FIG. 10. The amplitude of the d.c. voltage 42 is a function of the displacement of the sensing plate 13 from its null position and the sign of the d.c. voltage is determined by whether the sensing plate is near to one or the other of the drive plates 14 and 15. The output of low pass filter 41 is amplified in d.c. amplifier 43 and thence fed via a feedback steering circuit 44 to an appropriate forcing plate 45 or 46 of the transducer 12 to produce an electrostatic force on the moveable plate 13 so as to force the moveable plate 13 back to the null position.

The output of the d.c. amplifier 43 at 49 is a measure of the force required to rebalance the differential capacitor, i.e., it is a measure of the acceleration force being sensed. Likewise, the two outputs 47 and 48 from the feedback steering circuit 44 also are functions of the force necessary to restore the sensor 12 to null position and thus are a measure of the acceleration force being measured. Output 49, which was derived from the output of d.c. amplifier, 43 on line 49, has a sign determinative of whether the sensing plate 13 is nearer to drive plate 14 or 15 and an amplitude which is a function of the force exerted on the sensing plate which is to be rebalanced via the feedback, i.e., the acceleration force.

If an output appears on line 47 to restoring plate 45, it is known that the sensing plate is closer to the drive plate 15 than to drive plate 14. Conversely, if an output appears on output line 48 to restoring plate 46, it is known that the sensor plate 13 is nearer to drive plate 14 than to drive plate 15.

The acceleration force F which is being measured is related to the amplitude of the feedback voltage V via the expression $F=V^2$. Thus, the output at 47, 48 or 49 can be read out linearly as a measurement of the acceleration force by merely taking the square root of the absolute value of the feedback voltage and applying the appropriate sign.

Referring now to FIG. 5, there is shown the circuit 11 of FIG. 1 in greater detail. More particularly, triangular wave generator 18 includes three amplifiers 52, 53 and 54 connected as an oscillator for creating the two triangular waves 16 and 17 of opposite polarity on lines 19 and 21 used to drive the two excitation plates 14 and 15, respectively, of the transducer 12. Amplifier 52, such as a CA3130 operational amplifier, has positive feedback and acts as a comparator. The operational amplifier 52 is constructed with an MOS output stage which allows its output to swing nearly to the power supply potential, i.e., plus or minus 8 volts supplied to the amplifier 52 from a power supply 55. Amplifier 53 has a capacitor, as of 20 nanofarads, connected from its output back to its input to form an integrator. The output of amplifier 52 is fed via resistor 56 into the input of integrator 53 causing the output voltage of integrator 53 to change linearly with time on output line 21 as waveform 17. Waveform 17 is applied via potentiometer 22 to the input of a conventional inverter 54 via a center tapped resistor of the potentiometer 22. Assuming ideal amplifiers 52 and 53 and a center tap position for potentiometer 22, the output of amplifier 54 is waveform 16 which is merely an inverted version of waveform 17. Waveform 16 is connected back to the negative input of comparator 52 and so long as this fed back potential is more positive than the potential on the positive input terminal of comparator 52, the output of comparator 52 will remain low, i.e., −8 volts. The positive input applied to comparator 52 is simply a fraction of its output as determined by the ratio of the value of resistor 58 to the sum of the values of resistors 59 and 61. In the particular example given, this ratio is one-half and the positive input to comparator 52 is just one-half the negative power supply potential, or −4 volts.

Thus, the output of comparator 52 will remain at −8 volts until the feedback waveform 16, applied over feedback line 19, obtains a potential of −4 volts at which time the output of amplifier 52 will rise abruptly to +8 volts. This simply reverses all the polarities of the various signals, causing the positive going ramps to become negative going ramps and the negative going ramps to become positive going ramps. These ramps continue until the now positive going ramps at the output of amplifier 54 attains a potential of +4 volts, at which time the output of amplifier 52 reverses again and the circuit is returned to its original condition.

The frequency of resulting triangle waves 16 and 17 is independent of the power supply voltages since the change of slope of the triangular wave is exactly compensated for by the corresponding change of its amplitude. The frequency of the triangular waves is determined by the values of resistor 56 and capacitor 57. The amplitude of the triangular waves is determined by the power supply potentials and resistors 58, 59 and 61.

The position of the tap of potentiometer 22 determines the relative amplitudes of the two triangular waves 16 and 17. The tap of potentiometer 22 may be set so that the two waves are of identical amplitude or it may be set such that some desired, specific ratio is obtained. As pointed out above with regard to FIG. 1, adjusting potentiometer 22 compensates for initial offsets of the transducer 12 due to unequal mutually opposed areas of the pair of capacitors forming the differential capacitor 12. Also, the position of the tap of potentiometer 23 can be adjusted so as to obtain any fraction of either of the triangular waves 16 or 17 including zero. This signal is connected to capacitor 24 to provide a compensating input to preamplifier 26 to compensate for initial offsets in the null position of the moveable sensing plate 13.

The two triangular waves on output leads 19 and 21 are connected to the outer drive plates 14 and 15 of the transducer 12. The center sensor plate 13 of transducer 12 is connected via lead 25 directly to the negative input terminal of the operational amplifier 26. This input lead 25 is held at virtual ground potential by means of the negative feedback derived from the output of amplifier 26 via load resistors 27 and 31 to ground. The feedback potential is picked off of the node at 33 via resistor 28 and applied to the input lead 25.

The signal current that flows through the transducer capacitances is constant for each half cycle of the triangular waves since the voltage across these capacitances is increasing or decreasing linearly with time. The difference of current flowing in each transducer capacitance flows through resistor 28. If the transducer capacitances are equal, there is no resulting signal current through resistor 28. If the transducer capacitances are not equal, a resultant signal current of appropriate polarity flows through resistor 28. This signal current is alternately positive and negative on alternating half cycles of the triangular waves, the polarity depending upon which transducer capacitance is larger.

The stray capacitance from the transducer output to ground on lead 25 has no effect on the resulting signal current in resistor 28. If signal current were to flow through this stray capacitance, the voltage on lead 25 would deviate from zero, which is in conflict with the action of the negative feedback around amplifier 26 which holds this potential at zero. Thus, all transducer output current flows through resistor 28 regardless of the existence of this stray capacitance.

This alternating polarity constant current signal 32 develops a corresponding voltage signal at the output end of resistor 28, i.e., at node 33 which is simply a square wave centered at zero potential. This voltage signal is multiplied in the preamplifier 26 by the ratio of resistors 27 to 31 and appears at the output of amplifier 26. The amplitude of this square wave signal is proportional to the unbalance of the transducer capacitances and it is in phase with the triangular wave which is driving the transducer plate 14 or 15 which has the lesser capacitance to sensor plate 13.

The output signal derived from amplifier 26 is then coupled into the input of amplifier 35 through coupling capacitor 34. The coupling capacitor does not pass direct current or voltage and thus direct current offsets are not coupled through capacitor 34 into the second amplifier 35. The signal is referenced to zero potential via resistor 63 and is amplified by amplifier 35 which is connected as a conventional non-inverting amplifier with gain equal to one plus the ratio of resistors 64 to 65 connecting the output to ground.

The output of amplifier 35 is limited by a series connection of resistor 66 and parallel opposite polarity diodes 67 and 68 for limiting the amplitude of the output signal applied to the demodulator circuit 36. This prevents overloading the demodulator circuit 36 under unusual transient conditions. This limiting action has no effect on the normal operation of the system as the transducer output is normally near zero by virtue of the force feedback.

In the demodulator 36, the signal to be demodulated is applied to the input end of capacitor 69, as of 33 nanofarads. On every other half cycle of the input square wave, a switch 60 connects the output end of the capacitor 69 to zero potential under the control of an output derived from the demodulator driver 38. During the half cycles when switch 60 is off, the output potential on the capacitor 69 is just equal to the peak-to-peak amplitudes of the square wave signal. In other words, the signal has been referenced to zero potential, as shown by waveform 39 of FIG. 9, by means of the periodic grounding by switch 60.

When the output of capacitor 69 is at the peak-to-peak amplitude, switch 70 is closed via an output derived from the demodulator driver 38 for transferring the peak-to-peak voltage, as referenced to ground, onto capacitor 71. The polarity of the voltage transferred to capacitor 71 depends directly upon the direction of unbalance of the transducer 12 since the switches 60 and 70 are driven in phase with the original triangular wave excitation. For large peak-to-peak signal voltages, the value transferred to capacitor 71 is no longer proportional to the square wave signal due to the action of the limiting diodes 67 and 68. This is of no importance, as under normal operation, a signal at this point is much less than this clamp voltage due to operation of the sensor near the null position.

The demodulator further serves to discriminate against spurious signals that are not synchronous in frequency with the demodulator drive frequency, i.e., the triangular wave excitation. This is a fundamental property of synchronous demodulator 36 and greatly reduces the effect of noise on the system performance.

The value of the voltage transferred onto capacitor 71, representing the degree of transducer unbalance, is connected to the input of amplifier 43 via the intermediary of a low-pass filter comprised of resistor 73 and capacitor 74. This filter 41 further reduces noise and sets the rolloff frequency at which the gain of the electronics begins to decrease linearly with frequency. The rolloff frequency is fundamental to stabilizing the entire circuit when feedback is applied, as described in any standard text on the subject of control system theory. The time constant of filter 41 is thus set to provide total system stability and also determines the band width of the system.

The output of low-pass filter 41 is fed to the input of d.c. amplifier 43 which has a gain for positive signals of one plus the ratio of the resistance of resistor 75 to resistor 76 and a gain for negative signals of one plus the ratio of the value of resistor 77 to 76. In a typical example, the gain is 100. The two separate outputs, i.e., a positive output and a negative output are created by the action of diodes 78 and 79. This assures that feedback is applied only to the appropriate transducer forcing plate 45 or 46 to return the transducer to a null position. Since the gain of amplifier 43 is set to be very high, i.e., 100, the inactive feedback lead remains at a negligibly low level.

Power is supplied to the circuit from a power supply 55. Power supply 55 includes a pair of voltage regulators 81 and 82 connected in series with the respective positive and negative input potentials such as plus 15 and minus 15 volts, respectively. Shunting capacitors 83, 84, 85 and 86 are connected to ground across both the input and the output terminals of the voltage regulators 81 and 82 for isolating the output from power supply fluctuations and noise. The output d.c. amplifier 43 is connected to the full supply voltages, i.e., plus 15 and minus 15 volts, respectively, to maximize the available feedback voltage and thus the force to be applied to rebalance the transducer.

The output signals at 47 and 48 are simply feedback voltages applied to the transducer for restoring the transducer to the null condition. Additional processing of the output, such as linearization or automatic calibration would be performed on the outputs 47 and 48. In addition, the output at 49 carries a sign depending upon the sense of unbalance of the transducer and a magnitude corresponding to the force required to rebalance the sensor.

The demodulator driver circuit 38 generates signals to operate the demodulator switches 60 and 70 in synchronization with the transducer trianglewave excitation. Reference signal 37, FIG. 11, is derived from the output of comparator 52 in the triangle wave generator 18. This signal is in phase with the triangle waves and has an amplitude equal to that of the triangle waves divided by the ratio of resistor 61 to the sum of resistors 59 and 61, in this case, one-half. This reference signal is connected to the inputs of four comparators 90-93. The other inputs to the comparators are the transducer-excitation triangle waves 19 and 21, FIGS. 6 and 7. The signals and comparator polarities are arranged so as to produce the proper logic to create the required demodulator switch signals.

More particularly, excitation signal 16, FIG. 11, is connected to the positive input of comparator 90 and reference signal 37, FIG. 11, is connected to its negative input. The output of this comparator, in the absence of comparator 91, is shown at 87 in FIG. 11. The other excitation signal, 17, FIG. 11, is connected to the positive input of comparator 91 and the reference signal 37 is connected to its negative input. The output of this comparator, in the absence of comparator 90, is shown at 88 in FIG. 11. The outputs of the comparators are active in the low state but open in the high state, being pulled high by resistor 94. The connection of the two comparator outputs results in demodulator drive signal 89, FIG. 11. The result of the above logic is to produce a positive signal to activate demodulator switch 70 only during the middle half of one slope of the triangle waves which corresponds to the middle of one level of the square wave signal from amplifier 35. The actuation of the demodulator switch at this time avoids any noise or other signal degradation occurring during triangle wave transitions from one level to the other. The time-width of the demodulator drive signal is determined by the voltage levels of the reference signal 37 in relation to the voltage levels of the triangle waves 16 and 17 and is therefore solely determined by the ratio of resistors 59 and 61. The timing of this drive signal with respect to the others is fixed and independent of frequency of operation or power supply levels.

The other demodulator drive signal, 99, FIG. 11, is generated in the same manner using the same triangle wave and reference signals, comparators 92 and 93, and resistor 97. In this case, the polarities of the comparator inputs is simply reversed from the above case, producing a positive output during the alternate level of the square wave signal from amplifier 35 and is used to activate demodulator switch 60.

Referring now to FIGS. 2-4, there is shown an accelerometer employing the differential capacitive pickoff and force feedback electrodes previously described with regard to FIGS. 1 and 5. More particularly, accelerometer sensor 12 includes a silicon frame member 101 having two inwardly directed diametrically opposed support boss structures 102 supporting therefrom folded cantilever leaf spring portions 103 supporting a centrally disposed sensing mass 104. The folded cantilever spring structure, with surrounding frame 101 and central mass 104, is fully disclosed in the aforecited U.S. Pat. No. 4,144,516, the disclosure of which is hereby incorporated by reference in its entirety. Outer major faces of the leaf springs 103 and the mass 104 are recessed relative to the thickness of the frame 101 to provide a capacitive gap spacing on the order of 10 to 2 microns on both major faces of the spring and mass structures.

A pair of Pyrex glass plates 105 are disposed overlying opposite major faces of the frame member 101 and are bonded thereto via a thermal electric bond otherwise known as an anodic or mallory bond, at 106. The major faces of the Pyrex glass plates 105 which face toward the spring and mass structures, are metallized with a suitable metallization such as chrome and gold to a suitable thickness as of 5,000 Å. The metal is patterned to provide a ground shield electrode 107 disposed facing the folded cantilever spring portions 103, an annular forcing electrode 108 and a central sensing electrode 109.

The outer major faces of the Pyrex glass plates 105 are similarly metallized and patterned to provide three contact pads on the outer faces of each of the Pyrex glass plates 105. These contact pads 110 include a ground plane pad 111, a sensing pad 112 and a forcer pad 113. The pads 110 are connected to the electrodes 107, 108 and 109 respectively, via the intermediary of conductive leads 114 passing through the glass plates 105 and being electrically connected to the electrodes on the inside surfaces of the glass plates 105. In a typical example, the leads 114 are formed by sputter depositing chrome and gold onto the inside walls of laser drilled holes.

Electrical connection is made to the various contact pads 110 via wire bond leads and output lead 25 is bonded to the exposed edge of the silicon frame 101.

In operation, as the sensing mass 104 is deflected along its axis of sensitivity perpendicular to the plane of the paper of FIG. 3, the sensing mass moves closer to one of the excited electrodes 109 than the other producing an output on lead 25 which is thence amplified and demodulated to produce a feedback signal applied to the correct forcing electrode 108 for returning the mass 104 to the null position. The feedback signal serves as a measure of the force of acceleration.

Advantages of the capacitive sensing circuit of the present invention include:

1. triangular wave excitation produces a square wave output signal of the sensor which greatly facilitates peak detection when contrasted with sinusoidal excitation,
2. the preamplifier has zero input impedance such that stray input capacitance-to-ground has no effect, that is, there is no loss of signal amplitude nor loss of linearity, and
3. the adjustment in the relative amplitudes of the triangular wave excitation and the addition of a selected portion of the excitation directly onto the output of the sensor provides total compensation for variations in both the area and the spacing of the capacitive gaps of the differential capacitor of the sensor.

What is claimed is:

1. In a method for capacitively sensing displacement in a transducer of the type having a movable member which is displaceable relative to a support structure, the steps of:
   electrically exciting a capacitive gap between said movable member and an electrode fixed in position relative to said support structure with a time varying voltage;
   sensing from said excited capacitive gap a time varying output signal having an amplitude variable in accordance with the variable spacing between said movable member and said fixed electrode; and
   amplifying the sensed time varying output signal in an amplifier having essentially zero input impedance to ground to derive an output current signal, whereby the amplitude of said output current signal is generally independent of stray input capacitance to ground of said amplifier.

2. The method of claim 1 wherein the time varying excitation voltage for exciting the capacitive gap is cyclical having a period characterized in that in a first substantial portion of the period, the voltage changes with time at a generally constant first rate and has a first sign and during a second substantial portion of the period, the voltage changes with time at a generally constant rate generally equal to said first rate but of sign opposite to that of said first sign, whereby the output current signal is cyclical having a period characterized in that a first substantial portion of the period the current is of non-zero amplitude, generally constant with time and of one sign and during a second substantial portion of the period the output signal current is of non-zero amplitude generally constant with time and of a second sign opposite to that of said one sign, whereby measurement of said current signal is facilitated.

3. The method of claim 2 including the step of synchronously demodulating said output signal current at a period equal to or harmonically related to the period of said time-varying excitation voltage to derive a d.c. output signal of an amplitude which is a function of the displacement of said moveable member relative to said fixed electrode.

4. The method of claim 3 including the step of exciting a second capacitive gap between said moveable member and a second electrode fixed in position relative to said support structure with said d.c. output signal to create a force on said moveable member tending to urge said moveable member in a direction relative to said first fixed electrode so as to reduce the amplitude of said sensed time-varying output signal relative to a predetermined reference level.

5. In a method for capacitively sensing displacement in a transducer of the type having a moveable member which is displaceable relative to a support structure, the steps of:
   electrically exciting a pair of capacitive gaps between said moveable member and a pair of electrodes fixed in position relative to said support structure with a time-varying voltage;
   sensing from said excited capacitive gaps a time-varying output signal having an amplitude variable in accordance with the variable spacing between said moveable member and said pair of fixed electrodes; and
   amplifying the sensed time-varying output signal in an amplifier having essentially zero input impedance to ground to derive an output current signal of an amplitude which is generally independent of stray input capacitance to ground.

6. The method of claim 5 wherein the time-varying excitation voltage includes a pair of voltage components for exciting said pair of capacitive gaps each voltage component being cyclical and having a period characterized in that in a first substantial portion of the period the voltage changes with time at a generally constant first rate and of a first sign and during a second substantial portion of the period the voltage changes with time at a generally constant rate generally equal to said first rate but of sign opposite to that of said first sign, whereby the output current signal is cyclical having a period characterized in that in a first substantial portion of the period the current is of non-zero amplitude, generally constant with time, and of one sign and during a second substantial portion the output signal current is of non-zero amplitude, generally constant with time and of a second sign opposite to that of said one sign.

7. The method of claim 6 including the step of synchronously demodulating said output signal current at the period of said time varying excitation voltage or a period harmonically related to said period of excitation voltage to derive a d.c. output signal of an amplitude which is a function of the displacement of said movable member relative to said pair of fixed electrodes.

8. The method of claim 7 including the step of exciting a third capacitive gap between said movable member and a third electrode fixed in position relative to said support structure with said d.c. output signal to create a force on said movable member tending to urge said movable member in a direction relative to said first and second fixed electrodes so as to reduce the amplitude of said sensed time varying output signal relative to a predetermined reference level.

9. The method of claim 5 wherein the spacing between said movable member and each of said fixed electrodes is unequal in said capacitive gaps in the absence of a deflection of said movable member which is to be transduced such that there is an initial offset signal component of said time varying output signal produced by said unequal gaps;

deriving a compensating time varying voltage component from the excitation voltage for exciting said capacitive gaps;

said compensating voltage component being of a phase and amplitude to cancel said initial offset signal voltage component of said time varying output signal; and adding said compensating voltage component to said sensed output signal to compensate for initial offsets in the position of said movable member relative to said pair of fixed electrodes.

10. The method of claim 5 wherein the mutually opposed areas between said movable member and said pair of electrodes is unequal in said pair of capacitive gaps such that there is an initial offset signal component in the sensed output signal due to said unequal opposed area; and adjusting the relative amplitudes of the pair of voltages applied to said pair of capacitive gaps for electrically exciting same so that said initial offset signal component of the sensed output signal voltage is substantially reduced to compensate for initial offsets due to unequal mutually opposed area of said pair of capacitive gaps.

11. In a transducer of the type having a movable member which is displaceable relative to a support structure, such displacement being sensed by means of a capacitive gap between said movable member and an electrode fixed in position relative to said support structure, THE IMPROVEMENT WHEREIN, said transducer includes:

means for exciting said capacitive gap between said movable member and said electrode fixed in position relative to said support structure with a first time varying voltage;

means for sensing from said exciting capacitive gap a time varying output signal having an amplitude variable in accordance with the variable spacing between said movable member and said fixed electrode; and means for amplifying the sensed time varying output signal in an amplifier having essentially zero input impedance to ground to derive an output current signal of an amplitude which is generally independent of stray input capacitance to ground.

12. The apparatus of claim 11 wherein said time varying excitation voltage for exciting said capacitive gap is cyclical having a period characterized in that in a first substantial portion of the period the voltage changes with time at a generally constant first rate and has a first sign and during a second substantial portion of the period, the voltage changes with time at a generally constant rate generally equal to said first rate but of sign opposite of that of said first sign, whereby the output current signal is cyclical having a period characterized in that in a first substantial portion of the period the current is of non-zero amplitude, generally constant with time, and of one sign and during a second substantial portion of the period the output signal current is of non-zero amplitude, generally constant with time, and of a second sign opposite to that of said one sign.

13. The apparatus of claim 12 including, synchronously demodulating means for synchronously demodulating said output signal current relative to the period of said time varying excitation voltage to derive a d.c. output signal of an amplitude which is a function of the displacement of said movable member relative to said fixed electrode.

14. The apparatus of claim 13 including second electrode means fixed in position rleative to said support structure and defining a second capacitive gap between said second electrode and said movable member; and means for exciting said second capacitive gap with said d.c. output signal free of said first excitation voltage to create a force on said movable member tending to urge said movable member in a direction relative to said first electrode so as to reduce the amplitude of said sensed time varying output signal relative to a predetermined reference level.

15. In a transducer of the type having a movable member which is displaceable relative to a support structure and having a pair of electrodes fixed in position relative to said support structure and capacitively coupled to said movable member, the improvement wherein said transducer includes:

means for electrically exciting said pair of capacitive gaps with a pair of time varying voltages;

means for sensing from said excited capacitive gaps a time varying output signal having an amplitude variable in accordance with the variable spacing between said movable member and said pair of fixed electrodes; and amplifier means for amplifying the sensed time varying output signal and having essentially zero input impedance to ground to derive an output current signal of an amplitude which is generally independent of stray input capacitance to ground.

16. The apparatus of claim 15 wherein said pair of time varying excitation voltages for exciting said pair of capacitive gaps each is cyclical having a period characterized in that in a first substantial portion of the period the voltage changes with time at a generally constant first rate and having a first sign and during a second substantial portion of the period, the voltage changes with time at a generally constant rate generally equal to said first rate but of sign opposite to that of said first sign, whereby the output current signal is cyclical having a period characterized in that in a first substantial portion of the period the current is of non-zero amplitude, generally constant with time, and of one sign and during a second substantial portion of the period the output signal current is of non-zero amplitude, generally constant with time, and of a second sign opposite to that of said one sign.

17. The apparatus of claim 15 including synchronous demodulating means for synchronously demodulating said output signal current at a period synchronously related to the period of said time varying excitation voltages to derive a d.c. output signal of an amplitude which is a function of displacement of said movable member relative to said pair of fixed electrodes.

18. The apparatus of claim 17 including a third electrode structure fixed in position relative to said semiconductive support structure and capacitively coupled to said movable member; and means for exciting said capacitive gap between said movable member and said third electrode with said d.c. output signal to create a force on said movable member tending to urge said movable member in a direction relative to said first and second fixed electrodes so as to reduce the amplitude of said sensed time varying output signal voltage relative to a predetermined reference level.

19. The apparatus of claim 15 wherein the spacing between said movable member and each of said fixed electrodes is unequal in said capacitive gaps in the absence of a force on said movable member which is to be transduced such that there is an initial offset signal component of said time varying output signal produced by said unequal gaps;

means for deriving a compensating time varying signal component from the excitation voltage used for exciting said capacitive gaps, said compensating signal component being of a phase and amplitude to cancel said initial offset signal component of said time varying output signal; and means for adding said compensating signal component to said sensed output signal in said amplifier to compensate for initial offsets in the position of said movable member relative to said pair of fixed electrodes.

20. The apparatus of claim 15 wherein the mutually opposed areas between said movable member and said pair of electrodes is unequal in said pair of capacitive gaps such that there is an initial offset signal component in the sensed output signal due to said unequal opposed areas; and means for adjusting the relative amplitudes of the two voltages applied to said pair of capacitive gaps for electrically exciting same so that said initial offset signal component of the sensed output signal is substantially reduced to compensate for initial offset due to unequal mutually opposed areas of said pair of capacitive gaps.

21. In a method for capacitively sensing displacement in a transducer of the type having a movable member which is displaceable relative to a support structure, the steps of:

electrically exciting a capacitive gap between said movable member and an electrode fixed in position relative to said support structure with a time varying voltage which is cyclical having a period characterized in that in a first substantial portion of the period, the voltage changes with time at a generally constant first rate and has a first sign and during a second substantial portion of the period, the voltage changes with time at a generally constant rate generally equal to said first rate but of sign opposite to that of said first sign;

sensing from said excited capacitive gap a time varying output signal having an amplitude variable in accordance with the variable spacing between said movable member and said fixed electrode.

22. The method of claim 21 including the step of synchronously demodulating said output signal at a period equal to or harmonically related to the period of said time varying excitation voltage to derive a d.c. output signal of an amplitude which is a function of the displacement of said movable member relative to said fixed electrode.

23. The method of claim 22 including the step of exciting a second capacitive gap between said movable member and a second electrode fixed in position relative to said semiconductive support structure with said d.c. output signal to create a force on said movable member tending to urge said movable member in a direction relative to said first fixed electrode so as to reduce the amplitude of said sensed time varying output signal relative to a predetermined reference level.

24. In a method for capacitively sensing displacement in a transducer of the type having a movable member which is displaceable relative to support structure, the steps of:

electrically exciting a pair of capacitive gaps between said movable member and a pair of electrodes fixed in position relative to said support structure with a time varying voltage;

said time varying excitation voltage including a pair of voltage components for exciting said pair of capacitive gaps, each voltage component being cyclical and having a period characterized in that in a first substantial portion of the period the voltage changes with time at a generally constant first rate and of a first sign and during a second substantial portion of the period the voltage changes with time at a generally constant rate generally equal to said first rate but of sign opposite that of said first sign; and sensing from said excited capacitive gaps a time varying output signal having an amplitude variable in accordance with the variable spacing between said movable member and said pair of fixed electrodes.

25. The method of claim 24 including the step of synchronously demodulating said output signal at the period of said time varying excitation voltage or a period harmonically related to said period of excitation voltage to derive a d.c. output signal of an amplitude which is a function of the displacement of said movable member relative to said pair of fixed electrodes.

26. The method of claim 25 including the step of exciting a third capacitive gap between said movable member and a third electrode fixed in positive relative to said support structure with said d.c. output signal to create a force on said movable member tending to urge said movable member in a direction relative to said first and second fixed electrodes so as to reduce the amplitude of said sensed time varying output signal relative to a predetermined reference level.

27. The method of claim 24 wherein the spacing between said movable member and each of said fixed electrodes is unequal in said capacitive gaps in the absence of a deflection of said movable member which is to be transduced such that there is an initial offset signal component of said time varying output signal produced by said unequal gaps;

deriving a compensating time varying signal component from the excitation voltage used for exciting said capacitive gaps, said compensating signal component being of a phase and amplitude to cancel said initial offset signal component of said time varying output signal; and adding said compensating signal component to said sensed output signal to compensate for initial offsets in the position of said movable member relative to said pair of fixed electrodes.

28. The method of claim 24 wherein the mutually opposed areas between said movable member and said pair of electrodes is unequal in said pair of capacitive gaps such that there is an initial offset signal component in the sensed output signal due to said unequal opposed areas; and adjusting the relative amplitudes of the pair of voltages applied to said pair of capacitive gaps for electrically exciting same so that said initial offset signal component of the sensed output signal is substantially reduced to compensate for initial offsets due to unequal mutually opposed areas of said pair of capacitive gaps.

29. In a method for capacitively sensing displacement in a transducer of the type having a movable member which is displaceable relative to a support structure, the steps of:
  electrically exciting a pair of capacitive gaps between said movable member and a pair of electrodes fixed in position relative to said support structure with a first time varying voltage;
  sensing from said excited capacitive gaps a time varying output signal having an amplitude variable in accordance with the variable spacing between said movable member and said pair of fixed electrodes;
  synchronously demodulating said output signal at the period of said time varying excitation voltage or a period harmonically related to said period of excitation voltage to derive an output signal of an amplitude which is a function of the displacement of said movable member relative to said pair of fixed electrodes;
  exciting a third capacitive gap between said movable member and a third electrode fixed in position relative to said support structure with said demodulated output signal to create a force on said movable member tending to urge said movable member in a direction relative to said first and second fixed electrodes so as to reduce the amplitude of said sensed time varying output signal relative to a predetermined reference level; and
  said third excited capacitive gap being essentially free of said first time varying excitation voltage.

30. The method of claim 29 wherein the spacing between said movable member and each of said fixed electrodes is unequal in said capacitive gaps in the absence of a deflection of said movable member which is to be transduced such that there is an initial offset signal component of said time varying output signal produced by said unequal gaps;
  deriving a compensating time varying signal component from the excitation voltage for exciting said capacitive gaps;
  said compensating signal component being of a phase and amplitude to cancel said initial offset signal component of said time varying output signal; and
  adding said compensating signal component to said sensed output signal to compensate for initial offsets in the position of said movable member relative to said pair of fixed electrodes.

31. The method of claim 29 wherein the mutually opposed areas between said movable member and said pair of electrodes is unequal in said pair of capacitive gaps such that there is an initial offset signal component in the sensed output signal due to said unequal opposed areas; and
  adjusting the relative amplitudes of the pair of voltages applied to said pair of capacitive gaps for electrically exciting same so that said initial offset signal component of the sensed output signal is substantially reduced to compensate for initial offsets due to unequal mutually opposed areas of said pair of capacitive gaps.

32. In a method for capacitively sensing displacement in a transducer of the type having a movable member which is displaceable relative to a support structure, the steps of:
  electrically exciting a pair of capacitive gaps between said movable member and a pair of electrodes fixed in position relative to said support structure with a time varying voltage;
  sensing from said excited capacitive gaps a time varying output signal having an amplitude variable in accordance with the variable spacing between said movable member and said pair of fixed electrodes;
  the spacing between said movable member and each of said fixed electrodes being unequal in said capacitive gaps in the absence of a deflection of said movable member which is to be transduced such that there is an initial offset signal component of said time varying output signal produced by said unequal gaps;
  deriving a compensating time varying signal component from the excitation voltage used for exciting said capacitive gaps;
  said compensating signal component being of the phase and amplitude to cancel said initial offset signal component of said time varying output signal; and
  adding said compensating signal component to said sensed output signal to compensate for initial offsets in the position of said movable member relative to said pair of fixed electrodes.

33. In a method for capacitively sensing displacement in a transducer of the type having a movable member which is displaceable relative to a support structure, the steps of:
  electrically exciting a pair of capacitive gaps between said movable member and a pair of electrodes fixed in position relative to said support structure with a time varying voltage;
  sensing from said excited capacitive gaps a time varying output signal having an amplitude variable in accordance with the variable spacing between said movable member and said pair of fixed electrodes;
  the mutually opposed areas between said movable member and said pair of electrodes being unequal in said pair of capacitive gaps such that there is an initial offset signal component in the sensed output signal due to said unequal opposed areas; and
  adjusting the relative amplitudes of the pair of voltages applied to said pair of capacitive gaps for electrically exciting same so that said initial offset signal component of the sensed output signal is substantially reduced to compensate for initial offsets due to unequal mutually opposed areas of said pair of capacitive gaps.

* * * * *